Figure 1:
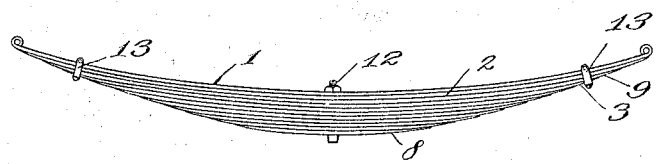

M. M. McINTYRE.
VEHICLE SPRING.
APPLICATION FILED DEC. 8, 1910.

1,014,406.

Patented Jan. 9, 1912.

WITNESSES:
Brennan B. West.
Oliver M. Kappler

INVENTOR,
Michael M. McIntyre
BY J. B. Hull
ATTY.

UNITED STATES PATENT OFFICE.

MICHAEL M. McINTYRE, OF CLEVELAND, OHIO, ASSIGNOR TO THE PERFECTION SPRING COMPANY, OF CLEVELAND, OHIO, A CORPORATION OF OHIO.

VEHICLE-SPRING.

1,014,406.  
Specification of Letters Patent.  
Patented Jan. 9, 1912.

Application filed December 8, 1910. Serial No. 596,187.

*To all whom it may concern:*

Be it known that I, MICHAEL M. McINTYRE, a citizen of the United States, residing at Cleveland, in the county of Cuyahoga and State of Ohio, have invented a certain new and useful Improvement in Vehicle-Springs, of which the following is a full, clear, and exact description, reference being had to the accompanying drawings.

This invention relates to vehicle springs, and has for its object the production of a spring of this kind which, while possessing sufficient strength to carry the load for which it is designed and sufficient resiliency to make riding agreeable, shall be provided with means whereby the shocks to which the vehicle is subjected may be absorbed, to relieve the spring, the vehicle body, and the contents thereof from injurious or disagreeable effects. I accomplish this object by constructing a spring in the manner described herein, one embodiment of my spring being illustrated in the drawings forming part hereof, wherein—

Figure 2:
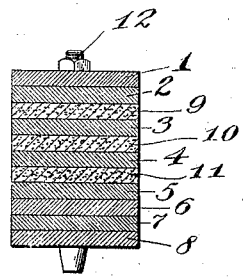
Figure 3:

Figure 1 represents a side elevation of such spring; Fig. 2 an enlarged sectional detail of the central portion of the spring shown in the preceding figure; and Fig. 3 a diagrammatic view representing the manner in which the spring is constructed in order to carry its load.

In constructing a spring in accordance with my invention, I make the main leaf and preferably the majority of the shorter or auxiliary leaves of tempered, resilient steel, in the ordinary manner. Practically all high grade springs are tempered in oil, and the aforesaid resilient leaves of my spring may be and preferably are tempered in like manner. A spring thus made, employing suitable steel, will be strong, durable and resilient, the resilience of the spring securing a yielding or elastic support for the load and causing the spring to return to the same position, under the same load, after a stress or strain tending to change this position has been removed. To apply my invention to a spring of this type, I embody therewith a certain number of leaves (dependent upon the total number of leaves in the spring and the carrying capacity of the spring) of relatively non-resilient metal, and possessing material strength such as Norway iron.

In Figs. 1 and 2 of the drawings, a spring is shown having a main leaf and ten shorter leaves, said leaves being graded in length and assembled in a manner which is ordinary in spring construction. The main leaf and seven of the shorter or auxiliary leaves are, in this embodiment of my invention, of tempered, resilient steel, while the remaining three leaves are of the non-resilient Norway iron. The numeral 1 designates the main leaf and the numerals 2, 3, 4, 5, 6, 7 and 8, the auxiliary leaves of tempered steel. The main leaf and preferably the next leaf are of tempered steel. The leaf 9 is of Norway iron as are also the leaves 10 and 11, the difference in material of the leaves being indicated on the drawing by a difference in the cross sectioning. The leaves are bolted together at their centers in the usual manner, as by a center bolt 12, and suitable clips 13 are applied to the springs, extending around the main leaf and the ends of an auxiliary leaf, which is next below the iron leaf 9, whereby all of the leaves of the spring will move in unison when the outer ends of the main leaf move toward or from the axle. The ultimate strength of the spring, that is, the strength of the spring as made up of the leaves of tempered steel and the leaves of Norway iron, will be approximately the same as the ultimate strength of the ordinary spring which is to support the given load, but, on account of the presence of the untempered Norway iron, the movements of the spring will be lazier, as this iron will oppose those movements of the other leaves which are due to their resiliency.

In constructing a spring in accordance with my invention, the leaves of tempered steel may be fitted with a greater initial arch or curvature than would ordinarily be given to a spring adapted for the load to be carried by the spring. For instance, suppose the opening of a spring as ordinarily constructed, before application to the vehicle, would be six inches, the arch or curvature given to the spring leaves, including the Norway iron leaves, may be considerably greater than this;—say seven inches altogether. Then, when the spring is tested at the factory, at which time the ends of the spring may be deflected as low as and even lower than the center of the spring, the untempered leaves oppose the return of the tempered leaves to the initial curvature given the latter, with the result that the curvature or arch of the spring is materially less than that originally given thereto and is somewhat less than that which would be given a spring of the ordinary type for the same load. These variations are represented diagrammatically in Fig. 3, in which $a$, $a$ represent the ends of the main leaf of the spring of my invention before being subjected to the test; $b$, $b$ the ends of the same main leaf after having been subjected to the test, and $c$, $c$ the ends of the main leaf of a well-tempered ordinary spring before and after the test. By this construction, I am enabled to use a less amount of tempered steel than ordinarily used, by employing a greater deflection of the same and approaching more nearly the elastic limit of the tempered material, thereby securing the greater ease of riding through the longer and slower period of motion for a given weight without the detrimental effects ordinarily attendant upon the use of an ultra flexible spring which, especially under light loads, by its flexibility, tends to reduce traction and interferes with steering the vehicle. The spring having been given the greater arch or camber indicated at $a$, $a$ the non-resilient leaves will, after the test, prevent the return of the resilient leaves to the position $a$, $a$, but will, on account of their lack of resilience exercise a drag upon the resilient leaves and hold the latter in the position shown at $b$, $b$ against the lifting action of the resilient leaves.

In applying the spring to a vehicle, the resilient leaves will exercise on the vehicle a certain preliminary or additional lifting effect which will be lacking from a spring as ordinarily constructed and of the same arch or camber as any spring possesses after the test.

By the method of constructing a spring in accordance with my invention, it is possible, not only to cheapen somewhat the cost of the spring (owing to the relative cheapness of the non-resilient metal therein) but, in fitting the resilient leaves, to give to the latter a curvature or arch which will cause the spring, when straightened (either under the test or under the incidents of use) to approach within a comparatively small percentage of the elastic limit of the steel, while making the assembled spring as safe, reliable and even more durable than one which has not been given such extreme deflection. This is rendered possible by the incorporation into the spring of the relatively non-resilient leaves, which lengthen the period of vibration of the spring. Furthermore, the use of two materials of different hardness for the leaves will cause a greater friction therebetween than if the leaves were of the same degree of hardness, thereby lengthening the period of vibration of the spring.

Having thus described my invention, what I claim is:—

1. A spring comprising a plurality of leaves of resilient metal and one or more leaves of relatively non-resilient metal combined with the former leaves and being of material strength and opposing a material resistance to the movements of the resilient leaves, whereby the non-resilient leaves contribute to the strength and diminish the vibrations of the resilient leaves.

2. A spring comprising a plurality of leaves of tempered resilient metal and one or more leaves of relatively non-resilient untempered metal interposed between the former leaves and being of material strength and opposing a material resistance to the movements of the former leaves, and means connecting the ends of the non-resilient leaves to the other leaves.

3. A spring comprising a plurality of leaves of tempered resilient metal and one or more leaves of relatively non-resilient metal interposed between the former leaves and possessing material strength and adapted to oppose material resistance to the movements of the resilient leaves without material detraction from the friction between the leaves of the spring, and means clamping the ends of the non-resilient leaves to the resilient leaves.

In testimony whereof, I hereunto affix my signature in the presence of two witnesses.

MICHAEL M. McINTYRE.

Witnesses:
CHESTER E. CLEMENS,
BRENNAN B. WEST.